(12) United States Patent
Bartfeld et al.

(10) Patent No.: US 7,277,445 B2
(45) Date of Patent: Oct. 2, 2007

(54) CALL MANAGEMENT VIA TELEVISION

(75) Inventors: Eyal Bartfeld, Lexington, MA (US); Giora Keinan, Rishon LeZion (IL)

(73) Assignee: Integra5 communications Inc., Wilmington, DE (US)

( * ) Notice: Subject to any disclaimer, the term of this patent is extended or adjusted under 35 U.S.C. 154(b) by 1056 days.

(21) Appl. No.: 10/189,269

(22) Filed: Jul. 2, 2002

(65) Prior Publication Data

US 2003/0086432 A1    May 8, 2003

Related U.S. Application Data

(60) Provisional application No. 60/338,730, filed on Nov. 5, 2001.

(51) Int. Cl.
*H04L 12/66* (2006.01)
*H04M 3/436* (2006.01)

(52) U.S. Cl. ............... 370/401; 370/356; 379/142.17; 379/201.01

(58) Field of Classification Search ............... 370/259, 370/265, 352, 356, 389, 401; 379/67.1, 201.1, 379/130, 142, 142.01, 142.14, 142.16, 142.17
See application file for complete search history.

(56) References Cited

U.S. PATENT DOCUMENTS

| | | | |
|---|---|---|---|
| 5,189,691 A | 2/1993 | Dunlap | |
| 5,317,630 A | 5/1994 | Fieinberg et al. | |
| 5,550,754 A * | 8/1996 | McNelley et al. | 348/14.01 |
| 5,561,709 A * | 10/1996 | Remillard | 379/93.19 |
| 5,566,231 A * | 10/1996 | Sizer, II | 379/142.16 |
| 5,583,927 A | 12/1996 | Ely et al. | |
| 5,592,477 A | 1/1997 | Farris et al. | |
| 5,623,537 A | 4/1997 | Ensor et al. | |
| 5,629,978 A | 5/1997 | Blumhardt et al. | |
| 5,696,815 A | 12/1997 | Smyk | |
| 5,712,902 A | 1/1998 | Florence et al. | |
| 5,754,546 A | 5/1998 | Voit et al. | |
| 5,796,806 A | 8/1998 | Birkbichler | |
| 5,907,604 A * | 5/1999 | Hsu | 379/142.06 |
| 5,937,038 A | 8/1999 | Bell et al. | |
| 5,969,749 A * | 10/1999 | Imaeda | 348/14.01 |
| 6,014,436 A | 1/2000 | Florence et al. | |
| RE36,707 E | 5/2000 | Papanicolaou et al. | |
| 6,144,644 A | 11/2000 | Bajzath et al. | |
| 6,219,355 B1 | 4/2001 | Brodigan | |
| 6,259,692 B1 | 7/2001 | Shtivelman et al. | |
| 6,266,524 B1 | 7/2001 | Dee et al. | |
| 6,292,210 B1 | 9/2001 | Gerszberg et al. | |
| 6,353,660 B1 | 3/2002 | Burger et al. | |
| 6,748,598 B1 * | 6/2004 | De Bot | 725/133 |

(Continued)

OTHER PUBLICATIONS

U.S. Appl. No. 60/308,737, Yaakov Dekel, Not published.

*Primary Examiner*—Chi Pham
*Assistant Examiner*—Saba Tsegaye
(74) *Attorney, Agent, or Firm*—Shalom Wertsberger; Saltamar Innovations

(57) ABSTRACT

A telephone call management system and method are disclosed, allowing for call review where a voice mail message being recorded for a specific telephone may be played on a television associated therewith during the time it is being recorded. Optionally, the call may further be retrieved and rerouted to the user telephone responsive to a command entered via the television distribution gateway, and any call may be recorded responsive to commands entered via the gateway.

22 Claims, 7 Drawing Sheets

U.S. PATENT DOCUMENTS 6,853,713 B1 * 2/2005 Fobert et al. .......... 379/142.17
2001/0038690 A1 * 11/2001 Palmer et al. ......... 379/218.01
2002/0147983 A1 * 10/2002 Michael et al. ............. 725/106

* cited by examiner

CALL MANAGEMENT VIA TELEVISION

RELATED APPLICATIONS

This application claims priority from U.S. provisional application No. 60/338,730 filed Nov. 5, 2001, which is incorporated herein by reference.

FIELD OF THE INVENTION

This application relates generally to telephone call management, and more particularly to supplying call management capabilities utilizing a television.

BACKGROUND OF THE INVENTION

Oftentimes, when a telephone call is unanswered for a certain number of rings (i.e. a predetermined time), the call is redirected to a messaging system adapted to receive at least voice messaging. In many cases a TAD (telephone Answering Device) is located at the subscriber premises. Such TADs often allow the subscriber to hear the message as it is being recorded, thus allowing the subscriber to pick up the call if desired. The capacity to listen to the incoming message without answering the call is called 'call preview' in these specifications. Many telephony service providers and PBX (Private Branch Exchange) systems offer voice mail—TAD like services—integrated into the telephony network. Some PBX's provide call preview services by using either dedicated keys on specialized telephones, or by complex dialing sequences. Some PBX systems connect to the user's computer and deliver call management via the computer. However public telephony services provide little if any call management features like the call preview. None provide the capacity for call retrieval, i.e. the capacity to answer the call after it was directed to the voice mail. Even advanced wireless telephony communication services such as GPRS (General Purpose radio Service) fail to provide such services. One of the reasons for the lack of service is due to the fact that the recording occurs in a messaging server remote to the subscriber home. Most simple telephones do not offer out of band signaling for controlling the operation as well as perform call screening. Thus not only is the user prevented from listening to the recorded message as it is being recorded, the telco (traditional telephony networks) or wireless based voice mail does not allow the user to 'change his/her mind' and pick up the call after it got directed to the voice mail service, as offered by a home based TAD. One exception to this limitation is described by Dee et al. in U.S. Pat. No. 6,266,524. However the Dee et al. does not allow call screening without the use of the telephone itself, which presents a disadvantage if the phone is used otherwise, such as during a "call waiting" incoming call.

There exist today the methods for providing caller identification (Caller ID, or CID henceforth) on a subscriber television. An example of such methods is shown in U.S. Pat. No. 5,754,546 to Voit et al.

Broadband system such as television distribution systems have been used as alternative to common carrier telephony systems. Typically, such system will have a class 5 telephony switch or a softswitch—a telephony switch driven primarily by software, installed in a television distribution center such as a headend, and interfaces with the telco network. From here on this example will refer to the softswitch, with the understanding that other telephony switching or interfacing that provide similar functionality may be substituted. The softswitch also interfaces with the headend, and utilizes the television distribution to distribute calls to the subscriber home. Oftentimes, the softswitch includes capabilities such as voice mail, call redirection, and the like. Generally, the softswitch is coupled to the headend to carry out the conversation, to learn if a telephone was picked up, etc. Oftentimes, the softswitch is communicating with the telco domain using SS7—a popular interface standard between telephony switching equipment. However even television distribution systems based telephony, fails so far to provide the call preview or the call retrieval features.

Thus, there is an unfulfilled need for easy-to-use call and massage management with a telephony provider automated answering services.

SUMMARY OF THE INVENTION

The present invention aims to supply call management features such as call preview and call retrieval using a combination of television and telephone. Preferably, the invention also provides caller ID services utilizing a television. It is further an object of the present invention to provide telephone call control capabilities such as control of messaging applications, and call directing, utilizing a television. Preferably, most call control services are performed in real time.

In the preferred embodiment, telephone calls arrive at telephony switch 25 (preferably a softswitch) from the PSTN (Public Switched Telephony Network) network. Preferably, CID (Caller Identification) information is also displayed on the television. However this step is optional. Information regarding the origin telephone number and information regarding the destination telephone number are retrieved and sent from telephony switch 25 to the telephony-television gateway 10 (TTG hereinafter). The TTG transmits the information, as video or as data, using transmission equipment 15, to STB 40 which displays the information on television 35. Simultaneously, or with a short delay, the telephony switch transfers the call to the subscriber's premises. In some cases, the caller ID data is transmitted between the first and second ring, and thus the ring occurs before the information is received and then transmitted to the television.

If the user does not pick up the phone (i.e. does not respond to the call), the call is redirected after a certain amount of time to a messaging server 90 adapted to receive at least voice mail messages. In these specifications, during the recording of the message, the telephone session becomes a 'messaged telephony session', or the 'messaged call'. The system provides the user with capability to listen to the message while it is being recorded. In the more preferred embodiment, the user may instruct the TTG to redirect the messaged call, to his premises.

Stated differently, the invention provides a messaging interface adapted to interface Television Telephony Gateway (TTG) to a voice capable messaging system adapted to receive messages of said incoming call if the call is not answered within a preset time. A preferred manner of achieving this aspect includes an instruction receiver adapted to receive instructions from a user, and the TTG being adapted to, responsive to said instruction, to receive a voice message from said messaging system and deliver the message to a selected video terminal associated with the user. A further preferred aspect of the invention provides for call retrieval, responsive to an instruction from a user. I.e., in response to a user command, the TTG instruct a telephone system from which the incoming call information arrives, to attempt to reconnect said unanswered call to the user, or an alternative phone number. Alternatively, the call may be otherwise redirected, such as by means of an alternative phone, or a television based phone system.

Thus an aspect of the invention comprises an apparatus and a system for providing call management services via television. The apparatus comprises a TTG that is adapted to couple directly or indirectly to a television distribution system, such as a cable network, and via that distribution system to a subscriber television. The TTG is also adapted to couple directly or indirectly to a telephony switch and receive information therefrom.

Therefore, in a preferred embodiment, the invention provides for a telephony television gateway apparatus adapted to operate in conjunction with a television distribution system, a telephony switch, and a messaging server adapted to record messages from a telephony network. The apparatus comprises a call information receiver adapted to monitor signals from the telephony switch or messaging server, the signals reflect information regarding a telephony session; a correlator adapted to associated the telephony session information with associated set-top boxes coupled to said distribution network; and transmission coupling equipment adapted to couple a message from said messaging server to the associated set top box, wherein said coupling occurs during the time said message is being recorded. Preferably, the coupling occurs responsive to user commands that are communicated to the system via a user command receiver. A parser parses the user commands and is adapted to communicate with the telephony switch, the messaging server or with both. The term session information may relate to an ongoing session or an attempted session. Thus the invention may be used both on a regular telephone call and on a 'call waiting' type call, which is a service commonly offered to allow more than one incoming call to be active at the same time (even if one is on 'hold' status).

In a more preferred embodiment, the TTG is adapted to instruct said telephony switch to attempt re connecting a messaged telephony session to the user associated with the session, or to another telephone, responsive to user commands. In this respect the user associated with the session is the one to whom the call was initially directed.

In another aspect of the invention, there is provided a method for call management using a television, the method comprising the steps of responsive to user commands, coupling a voice mail message to a television set associated with a user to which the message is directed, while said message is being recorded. This aspect on its own provides for call preview capability via a television. Preferably, prior to recording the message the method includes the steps of directing an incoming telephone call to a telephone associated with the user; routing the incoming call to a messaging server if the incoming call is unanswered during a predetermined period. Thus the telephony session becomes a messaged call; and then recording said message by said messaging server. preferably, the method further comprises the step of displaying information related to said incoming call, on the television set. Such information may comprise of the caller ID (origin number, caller identification, or a combination thereof) of the incoming call, the fact that a message is being recorded, and the like. However the term 'displaying' in this context may also include a voice annunciation, and other similar alerting methods.

In the most preferred embodiment of this aspect of the invention, the method further comprises the step of rerouting said messaged call to said telephone, responsive to user command. Alternatively, the method may comprise the step of rerouting said messaged call to a telephone specified by a user command.

Optionally, the call information receiver module is further adapted to receive termination indication from the telephony side, responsive to establishment or termination of said telephony session or the termination of the attempt to establish said session. The transmission coupling equipment is constructed to stop the transmission responsive to the termination indication. Alternatively, the transmission equipment is constructed to stop the transmission after a time delay, independently, or more likely under computer control.

Additional benefits of the system are considered, such as providing a pre-recorded announcement to nuisance callers such as telemarketers that their call is unwanted, prior to disconnecting them without recording a message. Optionally, the user may select the message played for the caller from a group of pre-recorded messages, by instructing the voice mail server, via the TTG, which message to play. Alternatively, the voice message selection entered by the user may be directed to the telephony switch that will direct the message to one of a plurality of voice mailboxes.

Clearly, the receiver module can be adapted to couple to a telephony switch directly or indirectly, as needed, and such manner of connection is a matter of technical choice. Also preferably, the transmission coupling equipment is constructed to transmit the information to the television terminal in the form of a video signal, a voice signal or data signal.

SHORT DESCRIPTION OF DRAWINGS

DETAILED DESCRIPTION

In these specifications, the term television distribution system signifies any system, wired or wireless, adapted for distributing television signals. Examples of a television distributing system include, but are not limited to, cable television, terrestrial, satellite, DSL, radio frequency, cellular and the like television signal distribution systems.

The terms 'set top box' interchangeably referred to as 'television terminal' or by the acronym STB, includes any external, internal, or other television controller or tuner for downstream or upstream feed. The set-top box need not be a separate box, but may be an integral part of some television models. The set-top box acts as an interface between the television and the television distribution system. The terms 'user' and 'subscriber' are used interchangeably, to denote the person or persons to whom the incoming call is directed.

Digital television transmission allows addressing specific information directly to specific subscriber by sending information to one or more set top boxes associated with the subscriber. The set-top box needs only minimal programming if any, to display the information for the specific user, and thus offers a 'private' programming channel like feature to operate on most STB's available today. One method of causing such display is described in a U.S. provisional application No. 60/308,737 filed Jul. 30, 2001 by Yaakov Dekel, entitled "Addressing specific transport stream program into subscriber's set-top box". This application is hereby incorporated by reference in its entirety. Other methods exist to address more specific types of STB, such as providing an STB that is programmed to be aware of its address and adapted to change the programming on the television. Additionally, some STB types are adapted to operate as programmable computers, utilizing the television screen as a video display.

Figure 1:
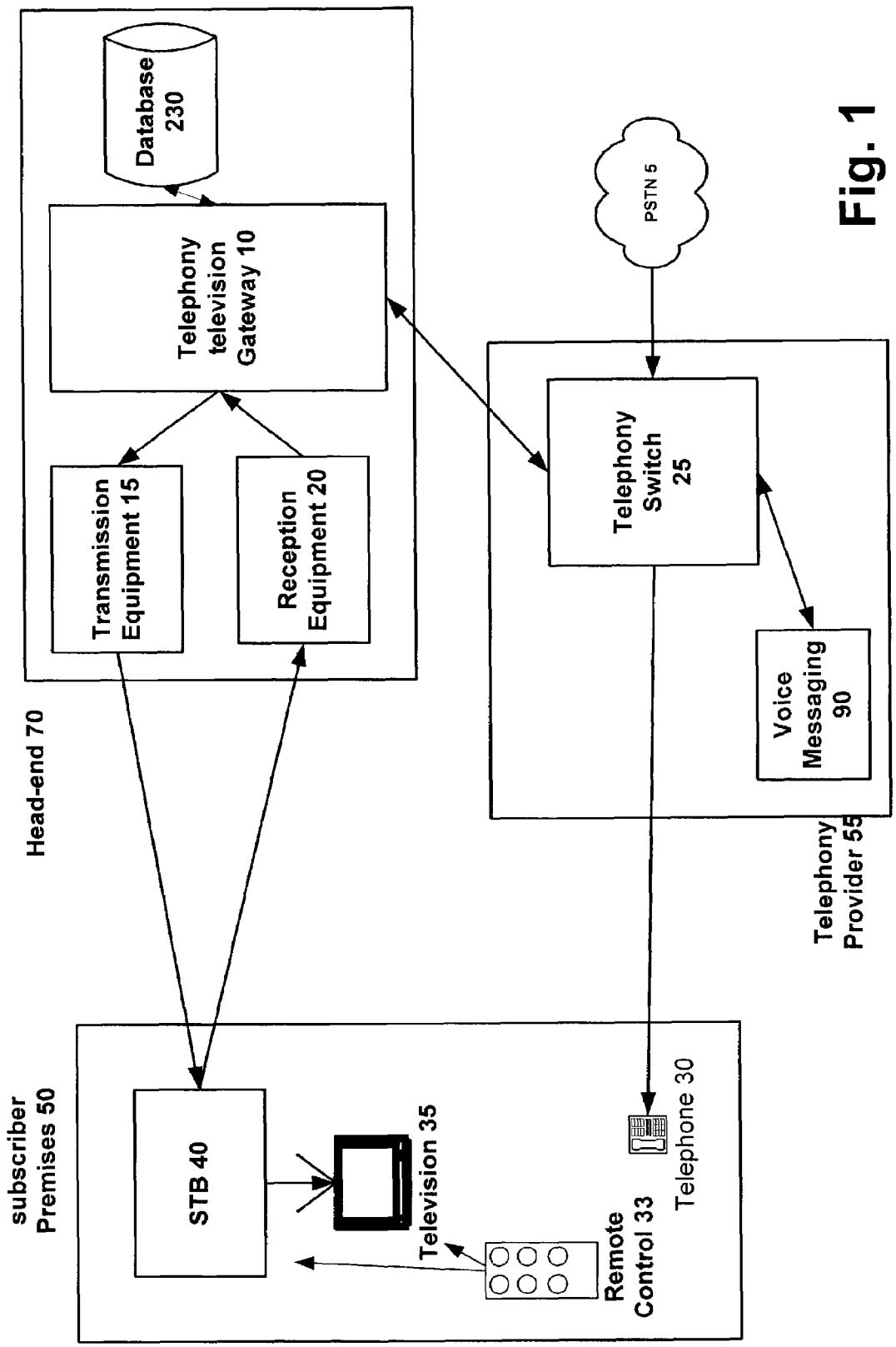
FIG. 1 depicts an overview of a system in accordance with an aspect of the present invention.

FIG. 1 depicts a simplified environment suitable for operating the TTG, and the methods described herein. The PSTN (Public Switched Telephony Network) 5 is coupled to a telephony provider 55, which may, for example, be a telco company, a cable company, an IP network, wireless telephony, and the like or any other provider of telephony services to the user premises. Telephony provider 55 utilizes a messaging system, preferably a unified messaging system, but any voice capable server will do. Telephony switch 25 couples, amongst others, between the PSTN 5, the voice messaging system 90, and the headend. Alternative constructs within the invention connects one or more of the components above directly to various elements of the telephony system. The switch is preferably a softswitch, however the system may operate with various switch types, such as a class 5 switch, a VOIP switch (Voice over IP (internet protocol)), and the like. Typically, the system is installed in the headend and includes the TTG 10, which utilizes a database 230 to correlate phone numbers to set top boxes. The database may be part of the TTG, external to it, or even located and/or operated remotely to it. Transmission coupling equipment 15 is used to couple the information to the user television set, via the distribution network, and STB 40. The transmission equipment may involve just equipment to couple to the headend equipment, a data signalling equipment such as a network coupled to the distribution network (e.g. a DSL modem to a DSL based television distribution network), direct coupling of video or data signals to a multiplexer, or even direct modulation equipment for feeding to a mixer. Thus the transmission equipment needs to couple between the TTG and the subscriber television via the distribution system, and the exact type and nature thereof is dictated by the broadband network architecture and structure and is a matter of engineering choice that will be clear to those skilled in the art.

Figure 2:
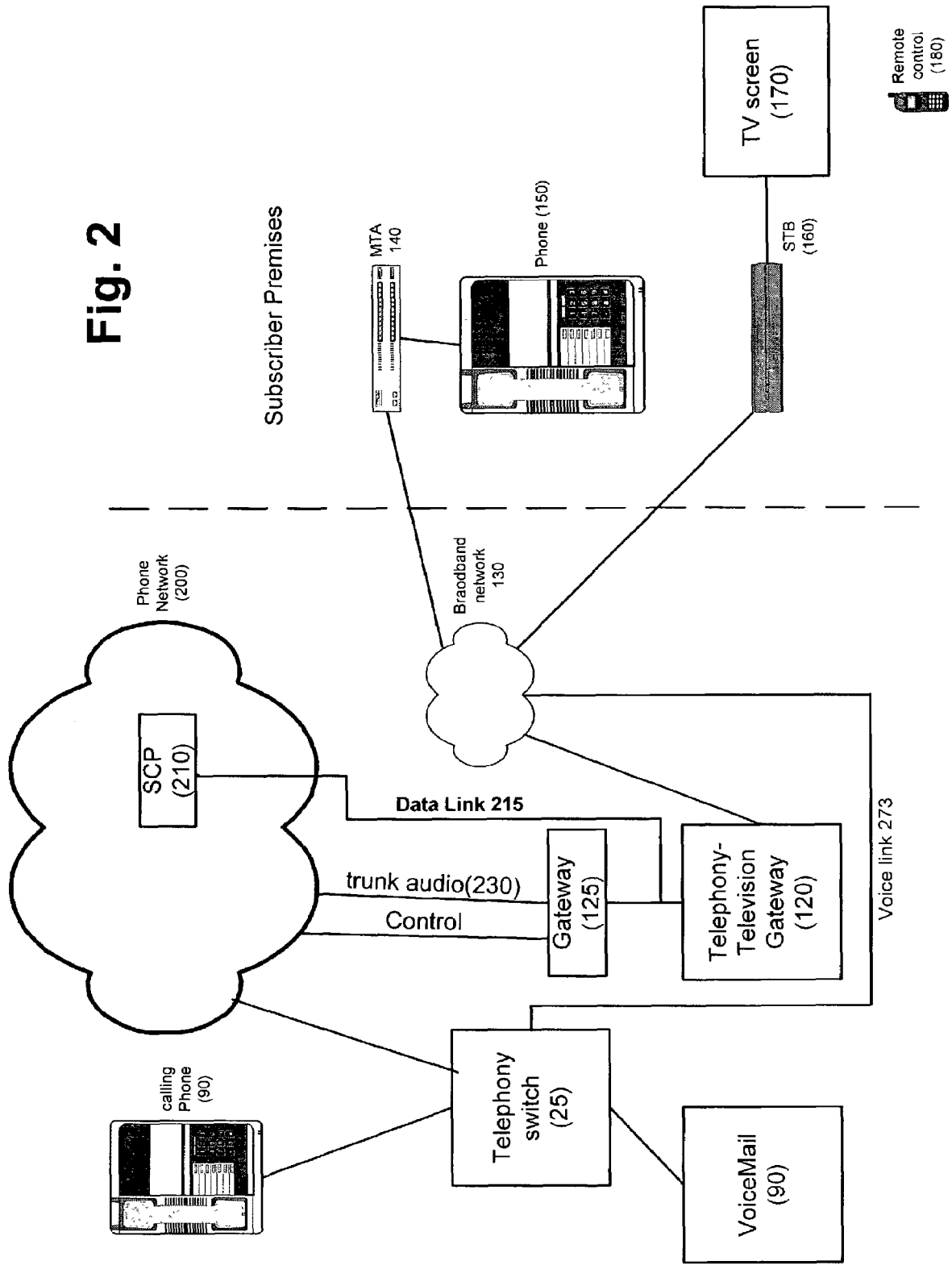
FIG. 2 depicts an example an overall system view of the preferred embodiment, utilizing broadband telephone access, and SS 7 signalling.

FIG. 2 shows a general system view of a typical system that comprises the preferred embodiment of the present invention, to aid in general understanding of the operation of various aspects of the invention. The caller uses the calling phone 90 in order to call user phone 150 in the subscriber premises. In this example, the telephone call is routed via the broadband network using voice link 273 which couples between the telephony switch and the broadband network, and MTA (Multimedia Terminal Adaptor) 140. Preferably, at about the same time, caller ID information is being supplied (e.g. from SCP 210 in case of SS7 signalling) to the TTG 120, and delivered to STB 160 for display on TV screen 170.

The subscriber at this point decides whether or not to answer the call. If the call is answered, the system completed its operation with regard to this call. However, optionally connect time information and the like may be continually displayed on screen. Further optionally, the audio stream to the television may be muted for the duration, by having the system instruct the set top box to mute, discontinuing the audio stream to the set top box, or any other convenient method. If the muting option is exercised, it is highly desirable that an override function be provided, to allow other viewers to continue and enjoy the television programming.

If the call is not received by the subscriber (the line is busy, the user does not answer, or declines to answer due to caller ID, etc.) the call is transferred by the telephony switch 25 to the voice mail 90. At this point the call becomes a messaged call. It should be noted that the location and ownership of the voice messaging server or the telephony switch may vary, i.e. they may reside in the television domain, or in the telco domain, or any other arrangement that allows routing and cooperation therebetween. Preferably at the time that a recording actually begins, a notification is sent from the telephony network to the TTG 120 via a data link. (Note that the data link and the audio link may be physically connected using the same line however in the depicted embodiment, gateway 125 interfaces between the SS7 and the TTG. It is fed with control signals, which can be any type of control in the server side and SS7 control in the SS7 side. The gateway 125 also receives AUDIO signals, that are SS7 connection in the SS7 side, and any audio connection in the server side. From the SS7 side the gateway acts as a STP and SSP. The TTG 120 generates a voice mail recording notification and sends it to the subscriber STB 160 which displays it on the TV screen 170 (or otherwise alerts the subscriber, e.g. by an audio message). The subscriber uses the remote control 180 in order to send commands to the server via the STB and the broadband network. The subscriber has three basic possible commands: Cancel, Pickup, and listen.

If the subscriber selects the cancel option the notification is removed from the screen. The message is being recorded for later retrieval as known.

If the subscriber selects the Listen option, the TTG 120 sends a command to the telephony switch. The switch duplicates the audio that is sent to the Voicemail 110 and sends a copy to the TTG. The TTG decodes the audio and transmits it to the subscriber STB via the broadband network. The STB send the audio to the TV speaker. If this option is selected, it is preferable to continue and display a command menu, to offer the option to stop listening, Pickup, or other options as desired.

If the subscriber selects the Pickup option, the server commands the telephone switch to rout the call again to the subscriber phone and stop the routing it to the voice mail and to the server. The phone rings and the subscriber receive the call. Alternatively, the user may dictate an alternative phone number to which the call be directed, and the call is thus directed to that number.

Preferably the user also receives the option to disconnect the caller during the call recording. This will offer an appropriate solution to unwanted calls such as telemarketing, etc. Optionally, a message, pre-recorded or made on the fly by the user, may be delivered to the caller, explaining that the call is unwanted prior to disconnecting the caller.

It will be noted that the action of duplicating the audio stream may be performed by the voicemail function 90, which may reside in the telco or in the broadband domain.

Figure 3:
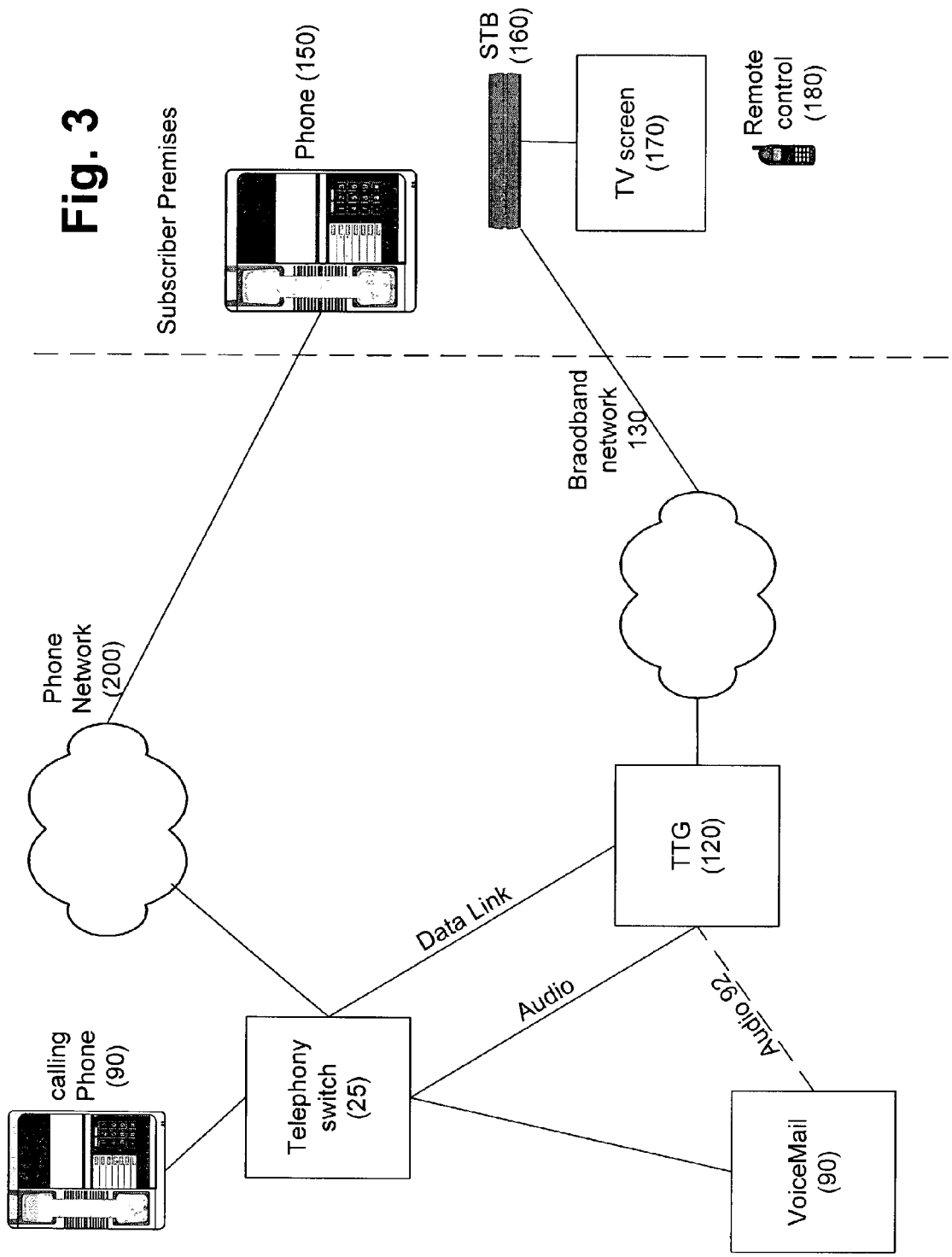
FIG. 3 depicts an example an overall system view of the preferred embodiment, utilizing telephone network access.

Also, in this embodiment, the TTG is connected to SS7 network. Thus the TTG is preferably connected to the telephone network 200 in two connections: one is the datalink 215, to the SCP (210) and the other to a gateway (220) receives control and audio trunk(s) (230) to the SS7 network FIG. 3 is very similar to FIG. 2, however the subscriber telephone is connected to the regular telephony network. Another difference is that this drawing shows the option of feeding the audio signal directly from the voice mail 90 server, via audio link 92. This is but one possible method of physical connection and routing of the audio and call information and commands. Details may vary as dictated by the type of network used, and the like, and the specific configuration is matter of engineering choice. The system is required to provide the capacity to communicate information with the telephone services, be they by telco, broadband, wireless, or any other arrangement. As long as information and the required control functions can be exchanged, the invention may be realized.

Figure 4:
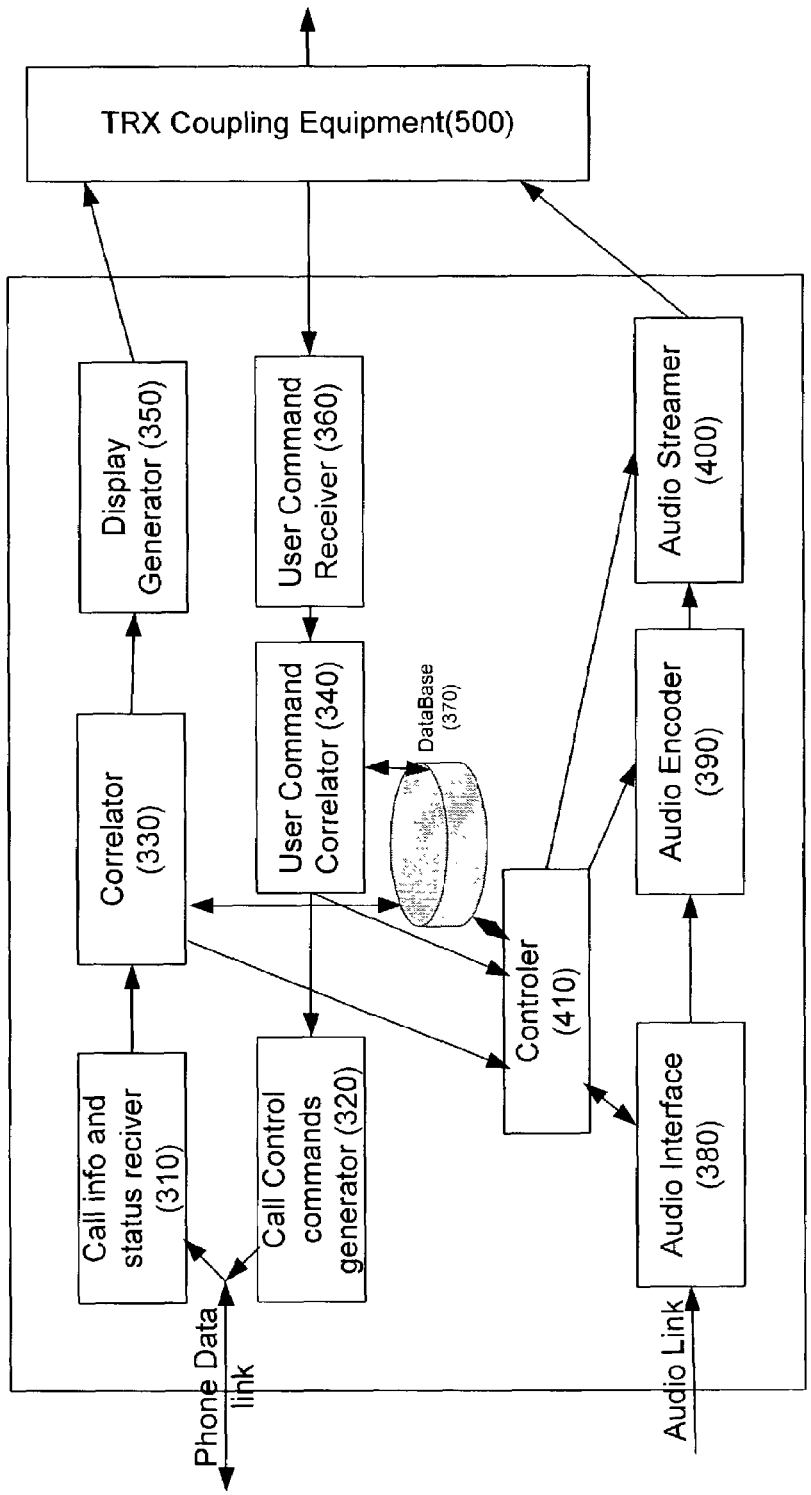
FIG. 4 depicts a more detailed view of a TTG in accordance with the more preferred embodiment of the invention.

FIG. 4 depicts a simplified block diagram of a Telephony-Television Gateway (TTG) in accordance with the preferred embodiment of the invention. The information about the voice mail recording is received by the call info and status receiver (310) which parses the message and transmits it to the correlator (330). The corellator correlates between the subscriber phone number (or physical line number) and the subscriber STB(s) address (or addresses) using the data base (370). The database may be incorporated with the TTG, or may be located elsewhere. The Display generator (350) generates a message in displayable format, and sends it to the transmission coupling equipment 500, which couple the formatted message to the actual transmission equipment that is coupled to the broadband network.

The "displayable format" can be a logic command which the STB client can display, a list of graphic primitives, an XML or a HTML file, etc. All of those formats may be sent using out of band data or in-band data, and the signalling method used is a matter of technical choice. If the selected signalling method is direct video, it can be sent using an in-band video stream. The preferred method is to use OOB (out of Band) data so the notification can be displayed when the subscriber is tuned to any channel.

When the user selects a command (cancel, listen, pickup, etc.) the user command receiver 360 parses the data. If needed, it queries the user command correlator 340, which gets the subscriber phone number form the data base 370 or from the controller 410. If the nature of the command dictate (e.g. listen), the user command receiver sends a command to the call control commands generator 320 which generates a command (Listen or Pickup) and send it to the phone network using a protocol appropriate to the system involved. When audio is received in the audio interface 380, the controller 410 uses the phone number for detecting the STB address, and sends it to the audio streamer 400. The phone number can be received using the audio link or the data link. Alternative methods of correlation, such as session identification may also be utilized. The audio is encoded by the audio encoder 390 and is streamed by the audio streamer 400 to the transmission coupling equipment 500. The audio transmission can be done as MPEG audio streaming (preferred), as in-band data, out of band data stream, or any other method applicable for transferring audio to an STB.

When the user selects the Pickup option, the controller commands the Audio streamer 400 to stop transmitting the audio. The controller 410 is responsible for synchronization between the two directions of the data link and the audio link, and for managing the subscriber session as required. The headend transmission coupling equipment is largely dependent on the broadband network type, equipment, and configuration. Generally, the transmission coupling equipment provides the data in a manner that can be decoded at the other side, and the rest of the packaging, modulation, multiplexing and the like is provided by the broadband network operator. Clearly, the coupling equipment may also comprise sufficient equipment to couple directly to the broadband network.

Figure 5:
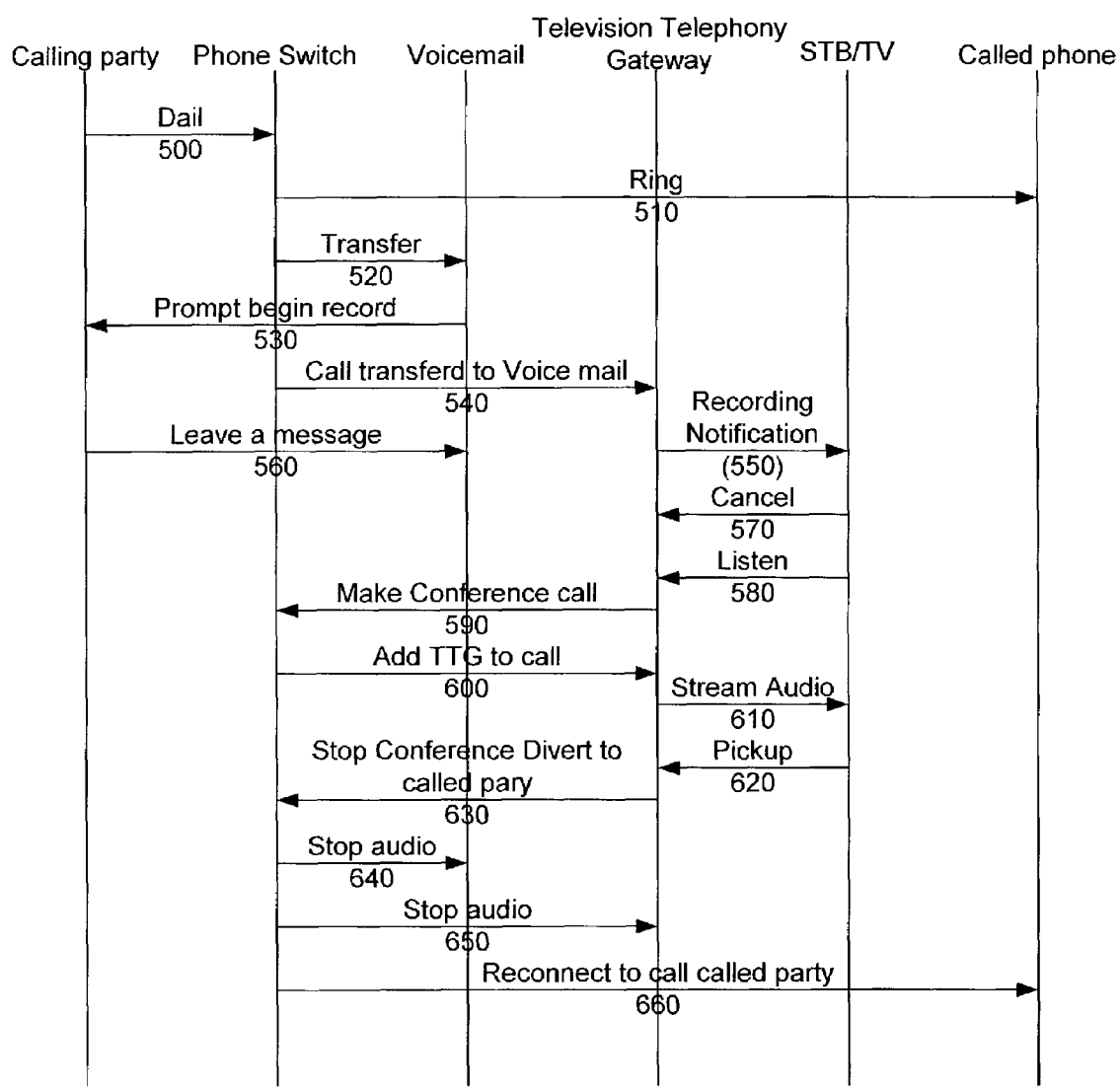
FIG. 5 depicts event flow in accordance with an embodiment of the invention, where the TTG is connected directly to the switch, without direct connection with the voicemail system.

FIG. 5 depicts ordered event flow in a typical session in accordance with an embodiment of the invention. The sequence originates when a caller initiates a telephone call 200. A ring signal is sent from the phone switch to the called telephone 510. if the call is not answered within a given time, it is transferred to voice mail 520. The voice mail prompts the user to begin recording 530, and shortly thereafter the caller begins to leave his message 560. Preferably prior to the step 560, the phone switch sends a message to the TTG that the call was transferred to voice mail, and the TTG transfers a notification to the STB that recording is taking place 550. The user at this point, have the option of sending a command to cancel 570 to the TTG, in which case the process terminates. Alternatively, the user sends the TTG a command to listen. In this embodiment, the TTG issues a request to the phone switch to change the call into a conference call 590, with the TTG being joined to the call 600. The audio received by the TTG is streamed to the user STB/television 610. The user has the option to send a command to the TTG to pick up the phone 620, in which case the TTG instructs the telephone switch to stop conferencing and divert the call to the called party 630. The phone switch stops the audio stream to the voice mail 640 and to the TTG 650 and reconnects the call to the called party.

Figure 6:
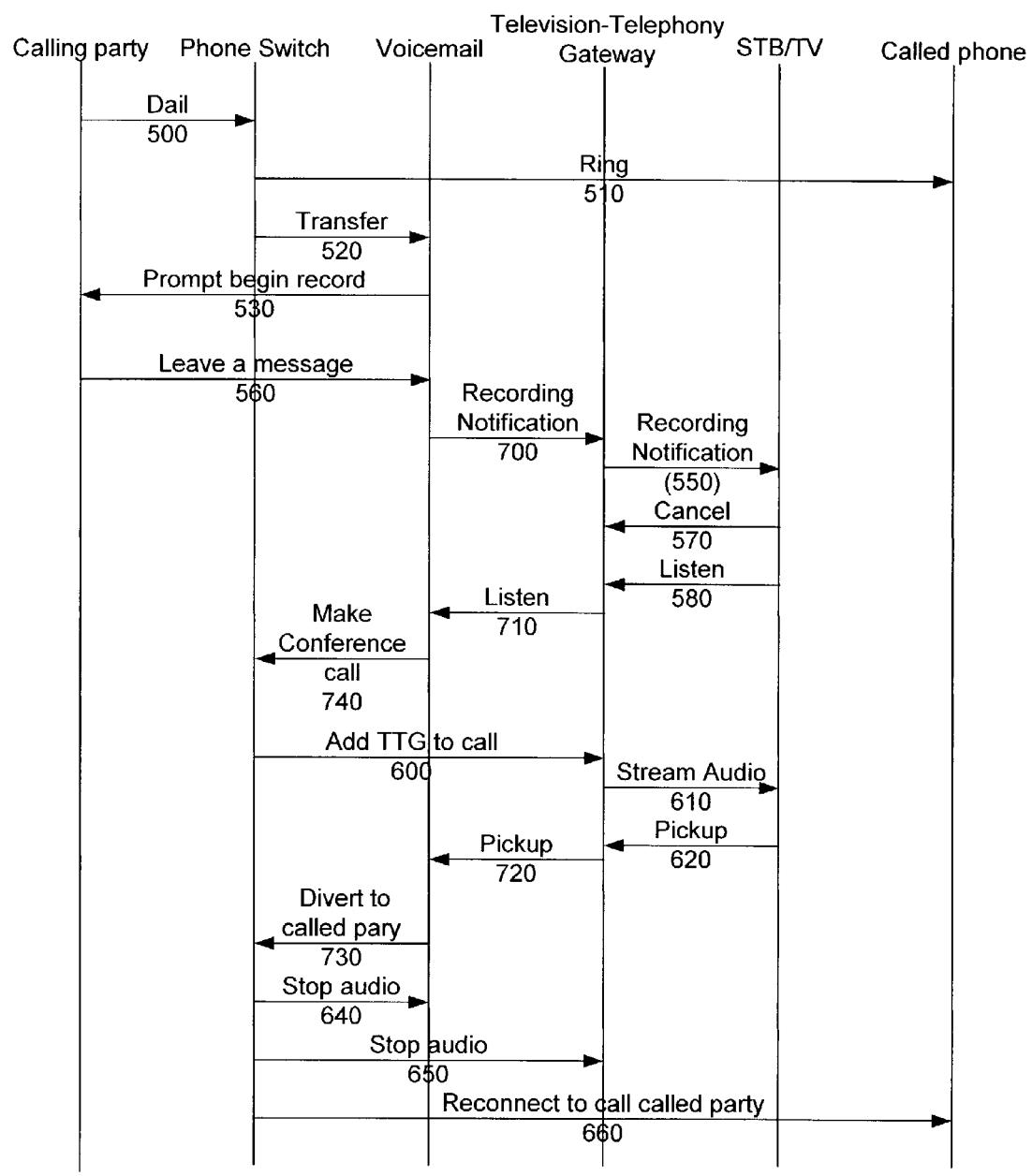
FIG. 6 depicts event flow in accordance with the preferred embodiment of the invention, where the TTG is connected to the voice mail system.

FIG. 6 depicts a similar event flow, however the rather than interacting mostly with the phone switch, a large portion of the interaction such as the recording notification and the transmission of user commands such as 710 and 720, occurs between the TTG and the voice mail server, which then acts as the interface between the TTG and the telephony domain.

Figure 7:
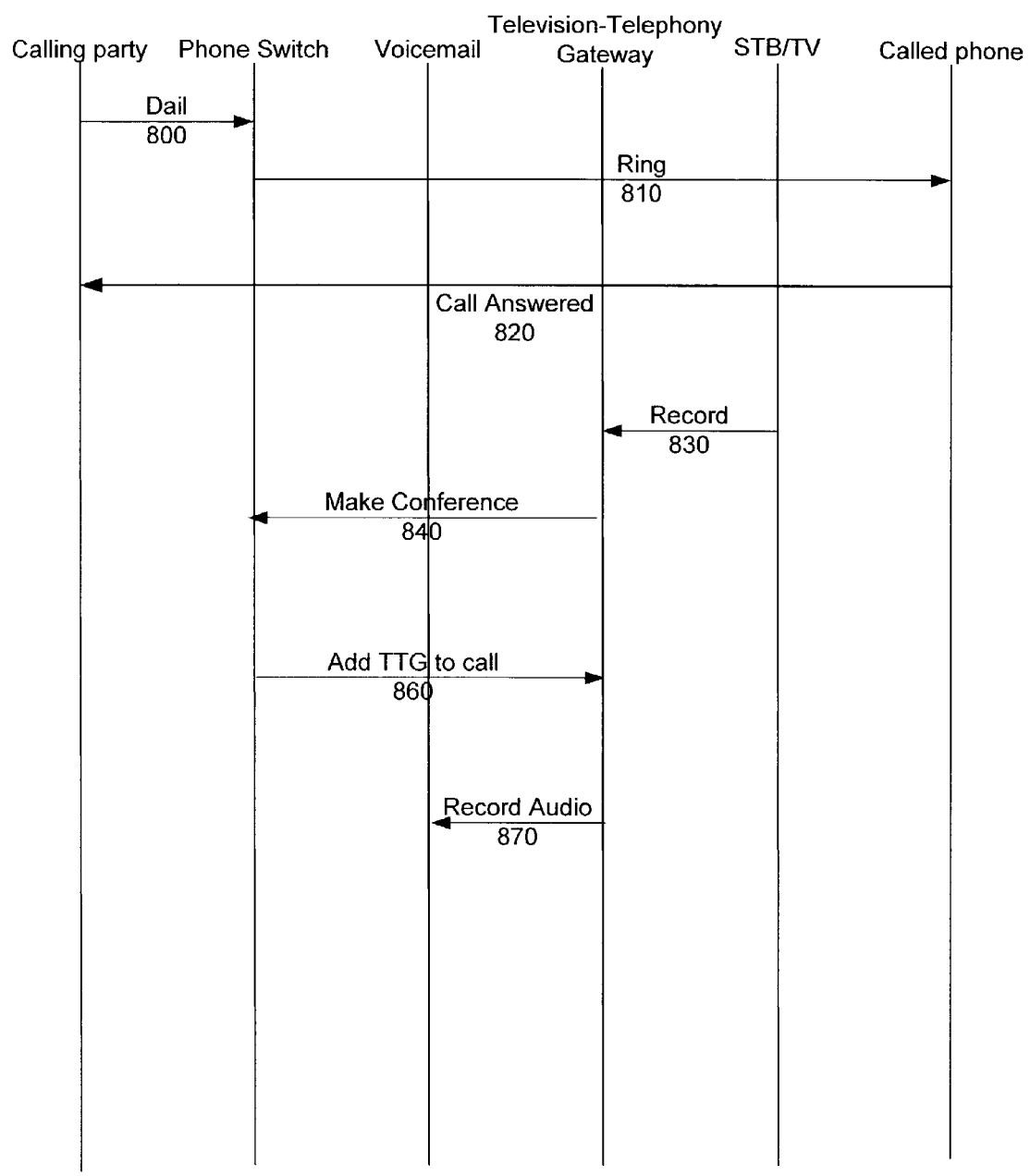
FIG. 7 depicts event flow for recording a telephone conversation.

Sometimes it is advantageous to record a telephone conversation, for example to avoid the need of taking notes during one. Thus an optional call management aspect of the invention further contemplates a method for recording the conversation, as shown in FIG. 7. In it, a call is placed 800 and the telephone at the subscriber home rings 810. The call is answered 820, and a telephone session ensues. At any time during the telephone session, the user may, using the remote control 180 for example, command the TTG to begin recording the conversation. The user may even select the recording option prior to picking up the call. The TTG then instructs the switch through which the telephone conversation is routed to create a conference call 840 and add the TTG to the ongoing call 860. By doing so a copy of the audio information that comprise the session is created. The TTG than directs the audio copy to a voice recorder device, in this example the voice mail server 870. Preferably, the connection of the voice mail is done directly from the switch if the switch is adapted to perform this task. In this arrangement, step 860 will just add the voice mail into the call, and step 870 does not take place.

It will be clear that the order provides for the recording is again highly dependent on the communication setup and is a matter of engineering choice. Thus for example, the TTG may have a more direct access to the audio, if the telephone session is carried over the broadband network, and the audio copy is available without the need for the conference call. It is similarly possible that the telephony switch may be directly instructed to record the session, especially if it is closely cooperating with the TTG. It will also be clear that other recording devices are feasible, such as an audio server, or any other device adapted top record voice or digital representation of voice, and store it for later selective retrieval. Thus again, this aspect of the invention should be considered primarily in terms of its function within the context and convenience of operating closely with a television and it is understood by those skilled in the art that different constructs and architecture dictate or offer selection of the components, and different distribution of the functionality within the constructs.

While the description relates several actions to the telephony switch, a person skilled in the art will understand that due to the extreme flexibility provided by the invention the actions may happen in other places within the telephony or 'telco' domain, and some may happen at the television distribution domain, or in combinations thereof. The actions themselves may happen by various pieces of equipment located physically in different places, or alternatively in one integrated system. One should also note that lately many television providers began to provide telephony services themselves. Clearly, it is much easier to implement the aspects of the invention if all the functionality of the telephony switch 25 and the messaging system 90 are under the control of a single organization. Thus the invention aims to cover different levels of integration between the 'telco' and television provider, including a third party intervening to facilitate such services.

We claim:

1. A telephony television gateway apparatus operational in conjunction with a television distribution network, a telephony switch, and a messaging server for recording messages from a telephony network, the apparatus comprising:
   a call information receiver for receiving session information from said telephony switch or messaging server;
   a correlator for associating the session information with an associated set-top box coupled to said television distribution network;
   an audio interface for receiving audio data from said messaging server, said audio data corresponding to a message, while said message is being recorded;
   an audio encoder coupled to said audio interface, for encoding said audio data received therefrom into a television broadcast compatible format to form television encoded audio; and
   transmission equipment coupled to said audio encoder and for transmitting said television encoded audio via said television distribution network to said associated set top box, wherein said transmission occurs during the time said message is being recorded.

2. A telephony television gateway apparatus according to claim 1, further comprising a user command receiver, for controlling the coupling of said message based on user commands.

3. A telephony television gateway apparatus according to claim 2, further comprising a parser for parsing said user commands and for communicating instructions to said telephony switch, in accordance with said user commands.

4. A telephony television gateway apparatus according to claim 2, further comprising a parser for parsing said user commands and for communicating instructions to said messaging server, in accordance with said user commands.

5. A telephony television gateway apparatus according to claim 1, further constructed to, responsive to user commands, instruct said telephony switch to attempt re connecting a messaged telephony session to the user associated therewith.

6. A telephony television gateway apparatus according to claim 1, wherein said call information receiver is further constructed to receive information about the origin of an incoming call, and transmit said information to said associated set top box.

7. A telephony television gateway apparatus according to claim 1, wherein said call information receiver is further constructed to receive a signal indicating a message is being recorded, and wherein the apparatus is constructed to transmit a notification thereof to said associated set top box.

8. A method for call management using a television, after a user rejects an incoming telephone call and said incoming telephone call is being directed to a messaging server, the method comprising the steps of: Responsive to user commands,
   receiving from said messaging server audio data corresponding to a message being recorded in the messaging server;
   encoding said audio data into a television broadcast transmission format to form television encoded audio; and,
   transmitting said television encoded audio via a television distribution network to said television associated with said user to which the message is directed, while said message is being recorded.

9. A method for call management using a television according to claim 8, further comprising the step of displaying information related to said incoming call, on said television set.

10. A method for call management using a television according to claim 9, wherein said information comprises call connect time information.

11. A method for call management using a television according to claim 9, wherein said information comprises identification of the caller number, the caller name, or a combination thereof.

12. A method for call management using a television according to claim 9, wherein said information comprises notification that said message is being recorded in said messaging server.

13. A method for call management using a television according to claim 8, further comprising the step of rerouting said messaged call to said telephone, responsive to said user commands.

14. A method for call management using a television according to claim 13, wherein said messaged call is terminated responsive to a user disconnect command.

15. A method for call management using a television according to claim 8, further comprising the step of rerouting said messaged call to a telephone specified by said user commands.

16. A method for call management using a television according to claim 15 further comprising the step of muting sound played by said television as long as said rerouted call is active.

17. A method for call management using a television according to claim 8, further comprising the step of alerting said user that said message is being recorded.

18. A method for call management using a television, comprising the steps of:
   directing an incoming telephone call to a telephone associated with a user;

displaying on the television associated with said user, information related to said incoming call;
routing said incoming call to a messaging server if said users declines to pick up said incoming call, or said incoming call was unanswered during a predetermined period, thereby forming a messaged call;
recording a message by said messaging server; and,
coupling said message to said television, while said message is being recorded;
said step of coupling comprising the steps of:
receiving audio data from said messaging server, said audio data corresponding to said message, while it is being recorded;
encoding said audio data into a television broadcast compatible format to form television encoded audio; and,
transmitting said television encoded audio via a television distribution system, to said associated television while said message is being recorded.

19. A method for call management using a television according to claim 18, further comprising the step of alerting the user when said message is being recorded.

20. A method for call management using a television according to claim 18, further comprising the step of rerouting said messaged call to said telephone, responsive to user command.

21. A method for call management using a television according to claim 18, further comprising the step of rerouting said messaged call to a telephone specified by a user command.

22. A method for call management using a television according to claim 18, further comprising the step of selecting a prompt the messaging server is to play to prompt the user of the messaged call.

* * * * *